Aug. 6, 1946.  E. WILDHABER  2,405,171
FACE CLUTCH
Filed Oct. 1, 1942   2 Sheets-Sheet 1

Inventor
ERNEST WILDHABER
By
Attorney

Aug. 6, 1946.    E. WILDHABER    2,405,171
FACE CLUTCH
Filed Oct. 1, 1942    2 Sheets-Sheet 2

Inventor
ERNEST WILDHABER
By
*Attorney*

Patented Aug. 6, 1946

2,405,171

UNITED STATES PATENT OFFICE 2,405,171

FACE CLUTCH

Ernest Wildhaber, Brighton, N. Y., assignor to Gleason Works, Rochester, N. Y., a corporation of New York Application October 1, 1942, Serial No. 460,331

17 Claims. (Cl. 192—67)

The present invention relates to toothed face clutches whose teeth extend generally radially of the clutch axis and whose tooth sides are curved longitudinally. More particularly, it relates to clutches of this type whose tooth sides have profiles extending substantially in the direction of the clutch axis, that is, clutches whose tooth sides are of zero or low (less than six degree) pressure angle.

Zero and low pressure angle clutches have hitherto required tools of corresponding pressure angles to produce them. An annular grinding wheel of zero pressure angle or of less than six degree pressure angle is, however, an impractical tool, for its diameter changes when it is dressed. Similarly face-mill cutters of zero pressure angle or of less than six degree pressure angle have serious practical drawbacks for the blades of such cutters have to have radial relief for cutting clearance back of their cutting edges. Hence, when such blades are sharpened, the radial positions of their cutting edges change, and the blades have to be adjusted radially in the cutter head after sharpening to bring their cutting edges back into correct cutting position. This is a time-consuming operation and must be performed with great care if accurate cutting is to be secured.

A primary object of the present invention is to devise a clutch of the character described which, even when of zero pressure angle, can be cut with a face mill cutter of positive pressure angle and which can be ground with an annular wheel of positive pressure angle. The blades of a face mill cutter of positive pressure angle may be axially relieved with the result that they retain their shape despite sharpening, and the only adjustment of the cutter required after sharpening is an axial adjustment of the cutter head, which adjusts all of the cutting blades simultaneously into correct cutting position. An annular grinding wheel of positive pressure angle has the same virtue; it retains its shape after dressing. In fact, the use of such a wheel is essential in order to obtain any appreciable life at all from an annular grinding wheel.

Other objects of the invention will be apparent hereinafter from the specification and from the recital of the appended claims.

Clutches made according to the present invention are cut or ground with a face mill cutter or annular grinding wheel of positive pressure angle by adjusting the cutter or wheel with reference to the clutch blank so that the axis of the tool is inclined to the clutch axis at an angle substantially equal to the pressure angle of the cutting edges of the tool. A tooth surface of the clutch member is then cut or ground by rotating the tool on its axis while effecting a relative depthwise feed movement between tool and blank, usually in the direction of the tool axis, until the tooth surface has been cut or ground to full depth. Then the tool is withdrawn from engagement with the blank and the blank indexed. A clutch member produced in this way will have side tooth surfaces which are surfaces of revolution whose axes are inclined to the clutch member.

In the preferred embodiment of the present invention a cutter or wheel of large diameter is employed and opposite sides of spaced teeth of the clutch member are cut or ground simultaneously. Thus, opposite sides of spaced teeth of the clutch member will lie in a common surface of revolution. The opposite side tooth surface of a clutch member will then all be longitudinally convex or all longitudinally concave depending upon whether they are cut with the inside or outside cutting edges, respectively, of the tool. One clutch member may be cut to have longitudinally convex tooth surfaces, and its mating clutch member may be cut to have longitudinally concave tooth surfaces. If longitudinally localized tooth contact between engaging clutch members is desired, their contacting tooth surfaces may be cut with different radii of lengthwise tooth curvature, or both members may be cut with longitudinally convex teeth.

The cutter or grinding wheel may have straight side-cutting edges in which case the side tooth surfaces of the clutch member will be conical surfaces, or the side-cutting edges of the tool may be of curved profile and the side tooth surfaces of the clutch member will be curved accordingly. When the side-cutting edges of the tool are of circular arcuate profile curvature and the center of the cutting edge lies on the axis of the cutter, the tooth surfaces produced on the clutch member will be spherical surfaces.

Figure 11:
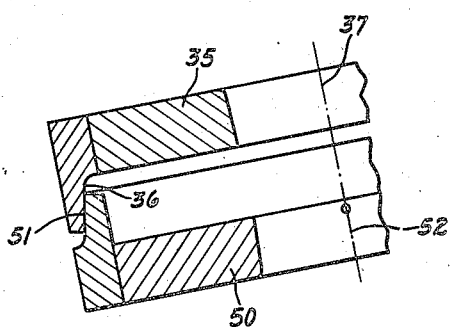
Figure 12:
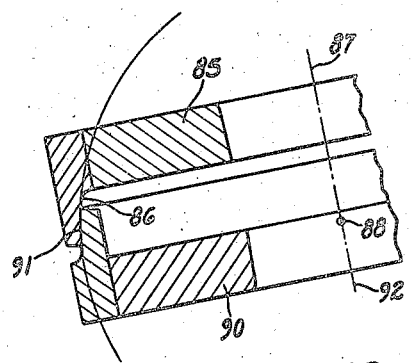

Fig. 11 is a fragmentary axial sectional view illustrating diagrammatically the relationship of two cutters, such as may be employed for cutting conical side tooth surfaces on a pair of engaging clutch members according to this invention; and Fig. 12 is a similar view showing the relationship between a pair of cutters such as may be employed for cutting spherical side tooth surfaces on a pair of engaging clutch members according to this invention.

In the drawings, 20 and 21 denote, respectively, the two members of a clutch pair made according to one embodiment of this invention. The member 20 has teeth 22 whose opposite side surfaces 23 and 24 are longitudinally convex and of straight profile. In the instance illustrated, the opposite sides of the teeth are of zero pressure angle, that is, their profiles extend in the direction of the clutch axis 25. The mating clutch member 21 has teeth 26 whose opposite sides 27 and 28 are longitudinally concave and of straight profile. Like the tooth sides of the clutch member 20, the tooth sides of the clutch member 21 are in the illustrated instance, of zero pressure angle, that is, their profiles extend in the direction of the clutch axis 25.

In the preferred construction, opposite sides of spaced teeth of each clutch member are made to lie in a common surface of revolution. Thus, the opposite sides 23a and 24b, respectively, of spaced teeth 22a and 22b of the clutch member 20 lie in a common surface of revolution denoted in Fig. 3 by the line 30. Likewise, opposite sides 27a and 28b of the spaced teeth 26a and 26b of the clutch member 21 lie in a common surface of revolution as denoted by the line 32 in Fig. 5.

In the construction illustrated in Figs. 1 to 6 inclusive, the side surfaces of the teeth of the clutch members are conical surfaces whose axes are inclined to the axis of the clutch member. Thus opposite sides 23a and 24b of the teeth 22a and 22b of clutch member 20 lie in a common conical surface whose axis 31 is inclined to the axis 25 of the clutch member as will be further explained hereinafter. Likewise the opposite sides 27a and 28b of the teeth 26a and 26b, for instance, of the clutch member 21 lie in a common conical surface 32 whose axis 33 is inclined to the axis 25 of the clutch member.

Figure 1:
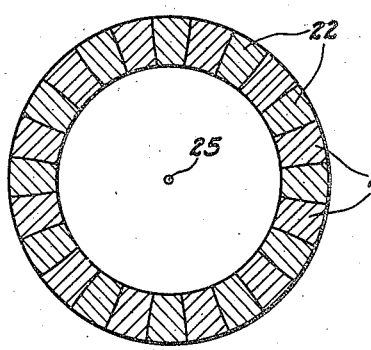
Fig. 1 is a sectional view of a pair of engaging toothed face clutch members made according to this invention, the section being taken in a mean plane, hereinafter referred to as the pitch plane, which is perpendicular to the clutch axis.
Figure 2:
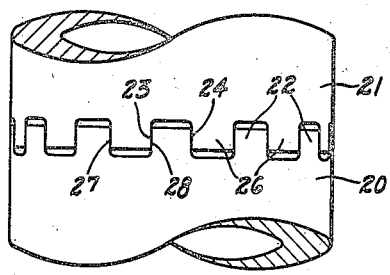
Fig. 2 is a fragmentary elevational view of the engaging clutch members.

The radii of lengthwise curvature of the tooth sides of the clutch members may be made equal or the radius of lengthwise tooth curvature of the tooth sides of one clutch member may be made less than the radius of lengthwise tooth curvature of the tooth sides of the other clutch member. In the first instance, the contacting tooth sides of the two clutch members will have full length contact with one another when the clutch members are in engagement. In the latter case the mating sides of the teeth of the two clutch members will have less than full length tooth contact, that is, localized tooth bearing, when the clutch members are in engagement. The first case is illustrated in Fig. 1 where the contacting tooth sides of the two clutch members have full length engagement.

Figure 3:
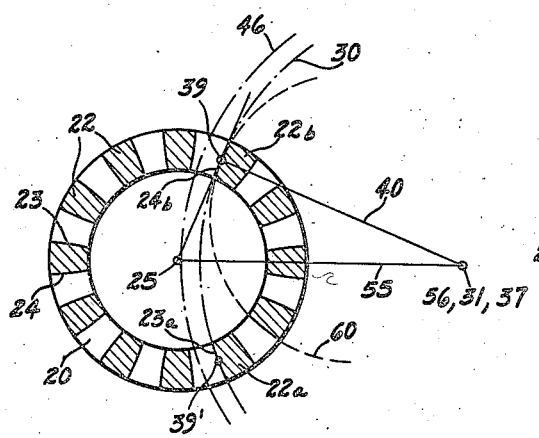
Fig. 3 is a diagrammatic view showing one of the clutch members in section in the pitch plane and illustrating the preferred method of cutting the same.
Figure 5:
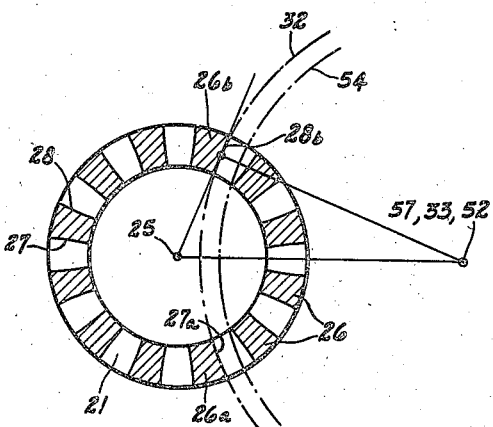
Figs. 5 and 6 are views similar to Figs. 3 and 4, respectively, showing the preferred method of cutting the mating clutch member.
Figures 4, 6:
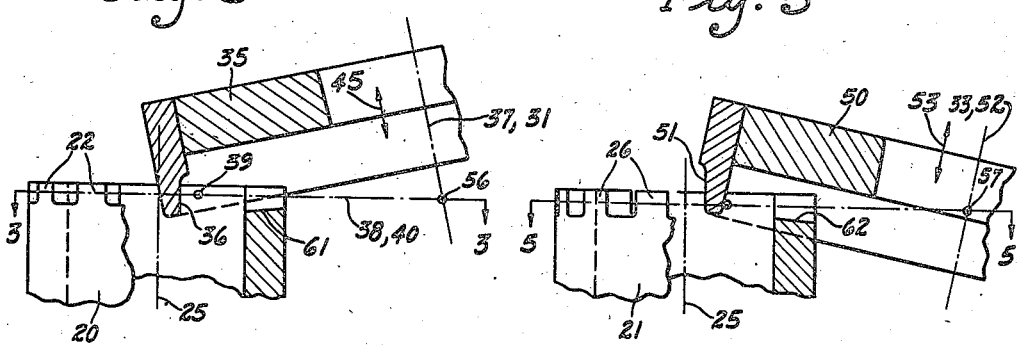
Fig. 4 is a part elevational, part sectional view further illustrating the preferred method of cutting this member of the clutch.

Figs. 3 and 4 illustrate the method of cutting the clutch member 20 while Figs. 5 and 6 illustrate the method of cutting the clutch member 21. For cutting the teeth 22 of the clutch member 20, a face mill cutter or annular grinding wheel 35 is used which has inside cutting edges 36 of straight profile inclined to the axis 37 of the cutter, that is, of positive pressure angle. The cutter is positioned with reference to the clutch blank so that its axis 37 coincides with the axis 31 of the tooth surfaces to be produced and is inclined to the pitch plane 38 of the clutch member at an angle substantially equal to the pressure angle of the inside cutting edges 36 of the cutter. The cutter is so tilted with reference to the clutch member 20, in other words, that at mean point 39, the normal 40 to a side tooth surface 24b of the clutch member 20 coincides with the normal to the cutting surface 36. The axes 37 and 25 of cutter and clutch are disposed in the same plane and will intersect one another when extended. The diameter of the cutter is preferably so chosen that it will cut opposite sides of spaced teeth of the clutch member simultaneously, as, for instance, opposite sides 23a and 24b of the teeth 22a and 22b as shown in Fig. 3.

In the cutting operation, the cutter is rotated in engagement with the clutch blank while the clutch blank is held stationary on its axis 25, and simultaneously a relative feed movement is produced between the clutch member and the cutter, preferably in the direction of the axis 37 of the cutter, as denoted by the arrow 45 in Fig. 4, in order to cut the tooth surfaces of the clutch member to full depth. After a pair of opposed tooth surfaces of spaced teeth of the clutch member have been cut to full depth, the cutter is withdrawn from engagement with the blank and the blank is then indexed. Then the feed movement is started anew to cut another pair of tooth surfaces of the blank. The path traced by the cutter in full depth position is indicated by the spaced lines 30 and 46 in Fig. 3.

The cutting of the side tooth surfaces of the clutch member 21 is affected in a manner similar to the cutting of the side tooth surfaces of the clutch member 20. For finishing the side tooth surfaces of the clutch member 21, however, a face mill cutter or annular grinding wheel is used which has outside cutting edges 51 of straight profile and positive pressure angle. Too, the cutter 50 is inclined inwardly with reference to the work piece instead of outwardly as in the case of the cutter 35. Cutting is effected as before, though, by rotating the cutter or grinding wheel 50 on its axis 52 while a relative feed movement is effected between the cutter and the work piece preferably in the direction of the axis 52 as denoted by the arrow 53 (Fig. 6). When a pair of opposed tooth sides of spaced teeth have been cut, the cutter is withdrawn from engagement with the work and the work indexed. Then the cutter is again fed into the work to cut another pair of tooth surfaces. The lines 32 and 54 (Fig. 5) indicate the path traced by the cutter in the cutting of the side tooth surfaces 27a and 28b.

In determining the cutter specification and cutter position for any assumed number of teeth between the two cutting zones of a cutter, as, for instance, between the teeth 22a and 22b in Fig. 3, the point 56 of intersection of the cutter axis with the pitch plane is located as the intersection point of the normal 40 to a tooth side 24b with plane 55 containing the axes of the cutter and clutch member, or as the intersection point of the normal 40 with a normal at the mean point 39' of the opposite tooth side 23a to be cut. These normals are perpendicular to the radii 25—39 and 25—39', respectively.

Point 57 (Fig. 5) is determined in like manner. Its distance from the clutch axis is the same as the distance 56—25 (Fig. 3) if it is desired to have contacting tooth surfaces on the two clutch members which will have full length engagement. If less than full length engagement is desired, a smaller cutter may be used in the cutting of one clutch member with the inside cutter surface, as for instance, in the cutting of the clutch member 20. The path, which may be traced by the cutting edges of such a smaller cutter, is denoted at 60 in Fig. 3. In the instance indicated, the smaller diameter cutter traces a path 60 which has one tooth less between its two cutting zones than the path 30 traced by the finish-cutting edges of the cutter 25. A localization of lengthwise tooth bearing may also be obtained by using a cutter of larger diameter than the cutter 50 in the cutting of the tooth surfaces of the clutch member 21. Localization of lengthwise tooth bearing may also be obtained by making both clutch members with longitudinally convex tooth sides, that is, both clutch members may be made like the clutch member 20.

Figure 7:
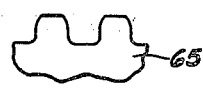
Fig. 7 is a fragmentary elevational view of a clutch member made according to this invention and having its teeth chamfered.

It is to be noted that due to the outward inclination of the cutter 35 to the clutch axis 25 in the cutting of the clutch member 20, the root surfaces 61 of the tooth spaces of the clutch member 20 will be inclined to its pitch plane, and that the teeth of the clutch member will be of greater depth at their inner than at their outer ends when the top surface of the clutch member is a plane surface, as shown in Fig. 4, perpendicular to the clutch axis 25. Likewise, due to the inward inclination of the tool 50, the root surfaces 62 of the tooth spaces of the clutch member 21 will be inclined to its pitch plane and the teeth of this clutch member will be higher at their outer ends than at their inner ends when, as shown, the teeth of the clutch member have plane top surfaces perpendicular to the clutch axis. The inclination of the root lines 61 and 62 of the two clutch members while opposite, will be of the same value if the cutters used in cutting the two clutch members have matching diameters and the inclination of the cutter axes 37 and 52 to the clutch axis 25 is the same. This applies equally when the sides of the clutch teeth form sharp edges with the tops of the teeth, as in Figs. 4 and 6, and when the sides of the clutch teeth are chamfered at their upper edges as is the case in the clutch member 65 shown in Fig. 7.

Figure 8:
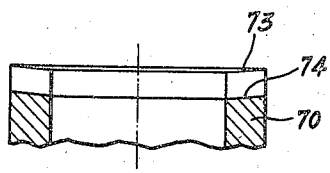
Fig. 8 is a fragmentary axial sectional view of a clutch member made according to a modification of this invention.
Figure 9:
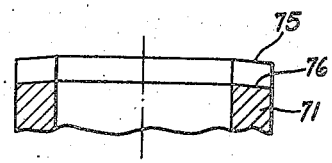
Fig. 9 is a corresponding axial sectional view of the clutch member which is to mate with the clutch member of Fig. 8.
Figure 10:
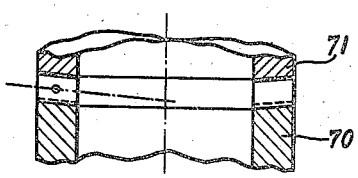
Fig. 10 is a fragmentary axial sectional view showing the clutch members of Figs. 8 and 9 in engagement.

Uniform tooth depth from end to end may be obtained on the two clutch members if the clutch members are designed as shown in Figs. 8 to 10 inclusive. Here, the top surface 73 of the clutch member 70, which like the clutch member 20 is cut with the inside cutting edges of an outwardly tilted cutter, is turned substantially parallel to its root surface 74, and is a slightly concave conical surface. Similarly, the clutch member 71, whose tooth surfaces are cut with the outside cutting edges of an inwardly tilted cutter like the clutch member 21, has its top surface 75 turned to be parallel to its root surface 76 and made as a slightly convex conical surface. The two clutch members 70 and 71 are, therefore, slightly tapered, member 70 being concavely tapered and member 71 being convexly tapered. The two clutch members may be made to match one another completely, however, as shown in Fig. 10.

Fig. 11 illustrates the relationship of the cutters 35 and 50 for cutting fully matched clutch members which have conical side tooth surfaces. The conical cutting surface constituted by the straight profiled inside cutting edges 36 of the cutter 35 fully matches the conical cutting surface constituted by the straight profiled outside cutting edges 51 of the cutter 50, and the axes 37 and 52 of the two cutters coincide when the cutting surfaces of the two cutters are brought into engagement.

The invention is not confined to the production of clutch members having conical side tooth surfaces with face-mill cutters or annular grinding wheels having straight side cutting edges. Thus, cutters or grinding wheels may be employed which have curved cutting edges. Two such cutters for producing fully matched clutch members are shown in Fig. 12. The cutter 85 for cutting one clutch member has inside finish cutting edges 86 of concave profile shape while the cutter 90 for cutting the mating clutch member has outside cutting edges 91 of convex profile shape. In the instance illustrated the cutting surfaces are matching spherical surfaces, the concave inside cutting edges of the cutter 85 being circular arcs centered at 88 on the axis 87 of the cutter, while the outside cutting edges 91 of the cutter 90 are convex circular arcs centered also at 88 on the axis 92 of the cutter. The axes 87 and 92 of the two cutters coincide in the view of Fig. 12. The concave inside cutting edges of the cutter 85 will sweep out convex spherical tooth surfaces on the clutch member cut by this cutter while the convex outside cutting edges 91 of the cutter 90 will sweep out concave mating spherical surfaces on the mating clutch member cut by this cutter.

The spherical cutters are used in the same way as the cutters previously described. In the cutting of a clutch member, a cutter is rotated on its axis while simultaneously a relative depthwise feed movement is produced between the cutter and blank preferably in the direction of the cutter axis until a pair of tooth surfaces of spaced teeth have been cut to full depth. Then the cutter is withdrawn from engagement with the blank and the blank is indexed.

While several different embodiments of the invention have been described, it will be understood that the invention is capable of further modification and this application is intended to cover any adaptations, uses, or modifications of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face clutch member having side tooth surfaces of less than six degrees pressure angle which are longitudinally curved and which are portions of surfaces of revolution whose axes are inclined to the axis of the clutch member.

2. A toothed face clutch member having side tooth surfaces of less than six degrees pressure angle which are longitudinally curved and which are portions of conical surfaces of revolution whose axes are inclined to the axis of the clutch member.

3. A toothed face clutch member having side tooth surfaces of less than 6° pressure angle which are longitudinally curved and which are portions of spherical surfaces of revolution whose axes are inclined to the axis of the clutch member.

4. A toothed face clutch member having side tooth surfaces of less than 6° pressure angle which are longitudinally curved, opposite sides of spaced teeth of said member lying in a common surface of revolution whose axis is inclined to the axis of said member.

5. A toothed face clutch member having side tooth surfaces which are longitudinally curved, opposite sides of spaced teeth of said member lying in a common surface of revolution whose axis is inclined to the axis of said member.

6. A toothed face clutch member having side tooth surfaces which are longitudinally curved, opposite sides of spaced teeth of the clutch member lying in a common conical surface whose axis is inclined to the axis of said member.

7. A toothed face clutch member having side tooth surfaces which are longitudinally curved, opposite sides of spaced teeth of said member lying in a common spherical surface whose axis is inclined to the axis of said member.

8. A toothed face clutch member having side tooth surfaces which are of zero pressure angle at mean points in their lengths, and which are longitudinally curved, opposite sides of spaced teeth of the member lying in a common conical surface.

9. A toothed face clutch member having side tooth surfaces which are of zero pressure angle at the pitch plane at mean points in their lengths, and which are longitudinally curved, opposite sides of spaced teeth of said member lying in a common spherical surface.

10. A toothed face clutch member having side tooth surfaces which are of zero pressure angle at mean points in their lengths, and which are longitudinally curved, opposite sides of spaced teeth of said member lying in a common conical surface whose axis is inclined to the axis of said member, the teeth of said member being of tapering depth from end to end and having their root lines inclined to the pitch plane of said member.

11. A toothed face clutch member having side tooth surfaces which are of zero pressure angle at mean points in their lengths, and which are longitudinally curved, opposite sides of spaced teeth of said member lying in a common spherical surface whose axis is inclined to the axis of the clutch member, said teeth being of tapering depth from end to end and having their root lines inclined to the pitch plane of the clutch member.

12. A toothed face clutch member having side tooth surfaces which are of zero pressure angle at mean points in their lengths, and which are longitudinally curved, opposite sides of spaced teeth of said member lying in a common surface of revolution, said teeth being of uniform depth from end to end and having both their root and their top lines parallel to one another but inclined to a plane perpendicular to the clutch axis.

13. A pair of engaging clutch members, each of which has side tooth surfaces that are longitudinally curved, opposite sides of spaced teeth of one clutch member lying in a common convex surface of revolution, and opposite sides of spaced teeth of the other clutch member lying in a common concave surface of revolution, the teeth of the first named clutch member increasing in height from their outer to their inner ends, and the teeth of the second clutch member decreasing in height from their outer to their inner ends.

14. A pair of toothed face clutch members, each of which has side tooth surfaces that are longitudinally curved, opposite sides of spaced teeth of one clutch member being parts of a common convex surface of revolution, and opposite sides of spaced teeth of the other clutch member lying in a common concave surface of revolution, the teeth of both members being of uniform height from end to end, the top and root surfaces of the first clutch member being concave conical surfaces and the top and root surfaces of the second named clutch member being convex conical surfaces.

15. A pair of toothed face clutch members, each of which has side tooth surfaces that are longitudinally curved, opposite sides of spaced teeth of one clutch member lying in a common convex surface of revolution whose axis is inclined to the axis of the clutch, and opposite sides of spaced teeth of the other clutch member lying in a common concave surface of revolution whose axis is inclined to the axis of the clutch, the teeth of both members being of uniform height from end to end, the top and root surfaces of the first named clutch member being concave conical surfaces and the top and root surfaces of the second named clutch member being convex conical surfaces.

16. A pair of toothed face clutch members whose teeth are of uniform height from end to end, the top and root surfaces of one member being concave conical surfaces, and the top and root surfaces of the other member being convex conical surfaces, said members having engaging side tooth surfaces at one side of their teeth at least which are of zero pressure angle at mean points in the tooth lengths and which are longitudinally curved, said tooth surfaces being convexly curved lengthwise on one member and concavely curved lengthwise on the other member, the member whose side tooth surfaces are concavely curved lengthwise having the convex conical top and root surfaces.

17. A pair of toothed face clutch members, each of which has side tooth surfaces that are longitudinally curved, opposite sides of the teeth of one member being convexly curved lengthwise, and of zero pressure angle at mean points in their lengths, and opposite sides of the teeth of the other clutch member being concavely curved lengthwise and being of zero pressure angle at mean points in their lengths, the teeth of both members being of uniform height from end to end, the top and root surfaces of the first clutch member being concave conical surfaces, and the top and root surfaces of the second clutch member being convex conical surfaces.

ERNEST WILDHABER.